United States Patent

[11] 3,617,242

| [72] | Inventor | Clinton Allen Hollingsworth<br>Lakeland, Fla. |
|---|---|---|
| [21] | Appl. No. | 757,413 |
| [22] | Filed | Sept. 4, 1968 |
| [45] | Patented | Nov. 2, 1971 |
| [73] | Assignee | Borden, Inc.<br>New York, N.Y. |

[54] FLUIDIZED BED DEFLUORINATION OF PHOSPHATE ROCK
5 Claims, 3 Drawing Figs.

| [52] | U.S. Cl. | 71/41, 23/109, 71/44 |
|---|---|---|
| [51] | Int. Cl. | C05b 13/02 |
| [50] | Field of Search | 71/41, 44; 23/1 F, 108 |

[56] References Cited
UNITED STATES PATENTS

| 2,528,514 | 11/1950 | Harvey et al. | 71/41 |
| 2,995,436 | 8/1961 | Hollingsworth et al. | 71/44 |
| 3,364,008 | 1/1968 | Hollingsworth et al. | 71/41 |
| 3,376,124 | 4/1968 | Hollingsworth | 71/41 X |

*Primary Examiner*—Samih N. Zaharna
*Assistant Examiner*—Bennett H. Levenson
*Attorney*—John L. Sigalos ABSTRACT: This invention relates to the defluorination of phosphate rock and similar natural phosphatic materials in a fluidized reactor in which there is no reaction between the rock and the defluorinating reagents prior to their addition to the fluidized reactor.

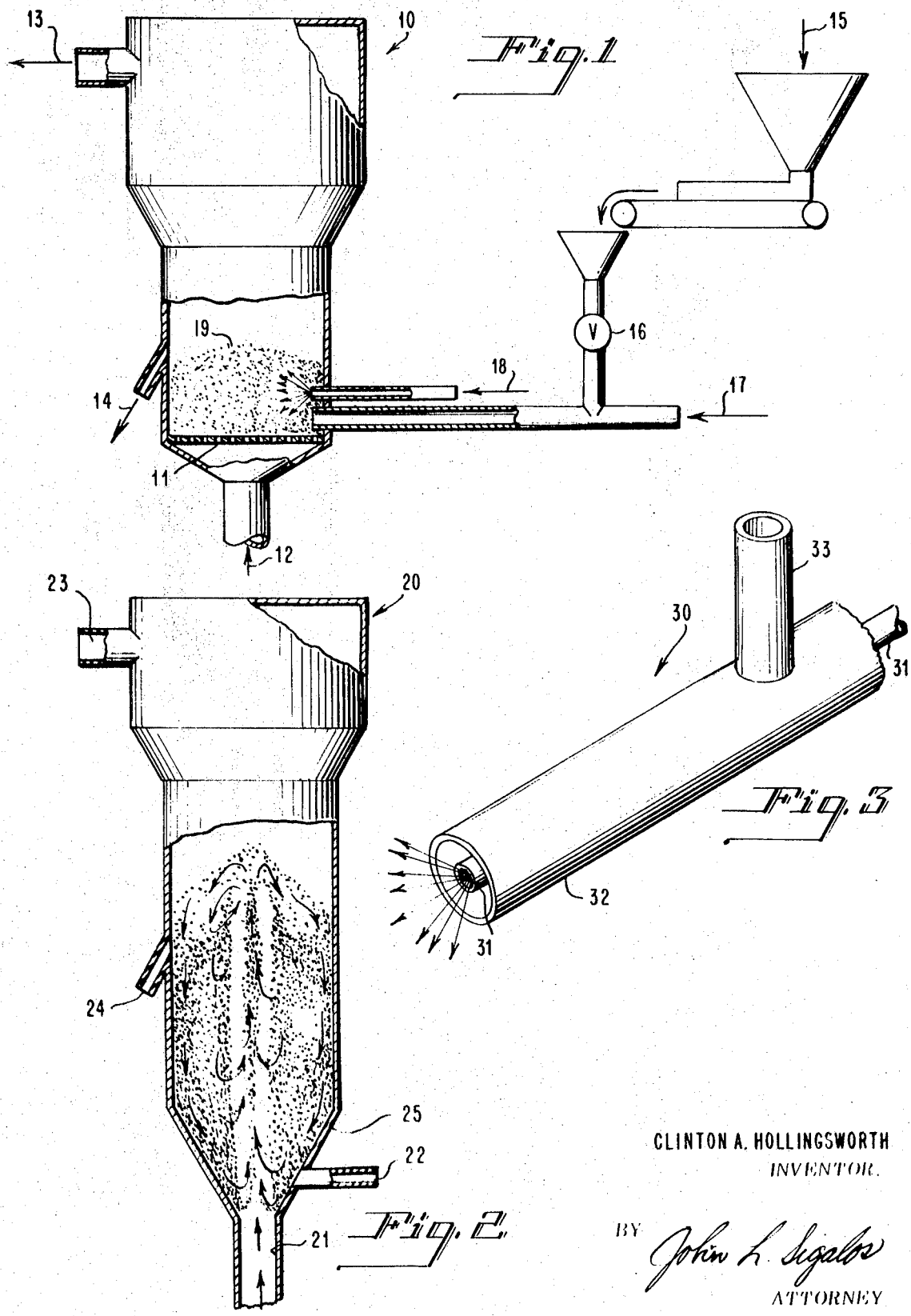

3,617,242

FLUIDIZED BED DEFLUORINATION OF PHOSPHATE ROCK

BACKGROUND OF THE INVENTION

U.S. Pat. Nos. 2,995,436, 3,189,433, and 3,364,008 exemplify the prior art practices of prereacting phosphate rock with defluorination reagents to form a nodulized or prereacted feed which is then defluorinated in a rotary kiln or fluid bed reactor. This feed preparation is costly in terms of equipment, plant, and time required and, further, results in the release of fluorine which must be removed from the gas stream to prevent air pollution. Equipment for such removal is expensive and difficult to maintain. Thus, feed preparation, whether for the purpose of preparing nodules or pellets for use in a rotary kiln or for prereacting phosphate with defluorinating reagents prior to feeding to a fluid bed reactor, is not entirely satisfactory.

SUMMARY OF THE INVENTION

It has now been found that the prereaction of phosphate rock with defluorination reagents can be completely eliminated prior to calcination thus obviating the need for special phosphate preparation prior to defluorination, eliminating the loss of phosphate rock, and preventing fluorine contamination that results from such processing.

Briefly stated, the present invention comprises the process of defluorinating fluorine containing phosphate rock by introducing the rock and defluorinating reagent or reagents into a fluidized reactor maintained at a temperature within the range of 2,300° F. to about 2,600° F., sufficient to defluorinate the phosphate rock, there being no reaction between said rock and reagent prior to their addition to the fluidized reactor.

BRIEF DESCRIPTION OF THE DRAWING

The new process will be better understood from the following description thereof in conjunction with the accompanying drawing wherein:

FIG. 1 is a schematic view of a fluid bed reactor for carrying out the process;

FIG. 2 is a schematic view of a spouted bed reactor for carrying out the process; and FIG. 3 is a schematic view of alternate means for introducing the phosphate rock and defluorinating reagents into either the fluid bed or spouted bed reactors of FIGS. 1 and 2.

DETAILED DESCRIPTION

As to materials, the fluorine containing rock to be defluorinated can be any domestic or foreign phosphate rock having a particle size up to about 6 mesh. (Tyler Standard) Preferred phosphate particle sizes are either −14 +200 mesh or a pulverized phosphate which is mostly +100 mesh. Coarser phosphates up to about 6 mesh handle nicely in the reactor but they require a higher temperature to defluorinate.

For best defluorination, particle size fractions of rock less than −100 mesh are preferred since in this range thin film defluorination is obtained. As each particle is defluorinated, additional particles will agglomerate with the existing defluorinated particles thus increasing the size of the rock by the so-called onion effect. Successive layers of small particle sized rock adhere to previously defluorinated layers resulting in a rapid and continuous defluorination of the rock and at the same time increasing the size of the particles. It will be evident that with large size particles additional time or higher temperature is required for the fluorine to escape from the interior of the particles and for the defluorination reagent to penetrate into the interior.

This thin film defluorination and its desired effect is indicated by the fact that when phosphates of substantially −100 mesh are defluorinated using 10 percent added $P_2O_5$ (as phosphoric acid) and 7 percent $Na_2O$ (as sodium hydroxide) a temperature of only 2,350°–2,450° F. is required. Under the same conditions, a temperature of about 2,520°–2,580° F. is required when the phosphate is mostly in the −14 to +35 mesh size and for −14 to +200 mesh phosphate temperature is in between.

The other preferred phosphate, −14 +200 mesh, has the advantage that cost of grinding is eliminated and even though some agglomeration takes place, the range of particle sizes is such that good fluidization is maintained; whereas, when pulverized phosphate is used, some fine recycle may be required for good fluidization if bed particles tend to become one size.

The defluorination reagent used can be any phosphorus containing material capable of reacting with the phosphate rock. It is preferred to use phosphoric acid or sodium phosphate since these will also increase the $P_2O_5$ level of the phosphate rock, but sulfuric acid and hydrochloric acid can also be used. It is in some cases preferred to add other materials such as soda ash (together with silica, if necessary), potash and the like in order to aid in the defluorination and to improve the phosphate availability of the defluorinated rock.

The fluidized reactor used can be a fluid bed reactor as illustrated in FIG. 1 or a spouted bed as illustrated in FIG. 2.

In accordance with the present invention and referring to FIG. 1, the phosphate feed rock as described above is fed through hopper 15, air seal 16 and blown by an air injection (not shown) through line 17 into a fluid bed reactor 10. The reactor 10 is provided with a grid 11 to support a bed 19 created by the phosphate rock particles and fluidizing air 12 entering the reactor 10 beneath the grid 11. The reactor also has an exhaust vent 13 for the exhaust gases and a product discharge opening 14. Also provided is an opening 18 for separately introducing the defluorinating reagent to the bed.

In the spouted bed illustrated in FIG. 2, the phosphate feed rock is fed into the spouted bed 20 along with air and gas through air pipe 21. The defluorinating reagent is separately introduced into the reactor 20 as through line 22 in the cone portion 25 of the reactor. The reactor is also provided with an exhaust vent 23 for the exhaust gases and a product discharge opening 24.

FIG. 3 illustrates an alternate means for introducing the phosphate rock feed and defluorinating reagent into a reactor to insure intimate admixture thereof for most effective defluorination. The phosphate rock feed is fed through line 33 into feeder line 32 where air is used to blow it into the reactor. Pipe 31 is contained within feeder line 32 and such pipe is used to introduce the defluorinating reagent into the reactor. The phosphate rock feed as it leaves the feeder line 32 in the reactor passes through a spray of defluorinating reagent (illustrated by the arrows) which acts to insure intimate admixture of the two materials.

There is no prior reaction of the rock with the defluorination reagent thus completely eliminating feed preparation and the costly processing time, equipment, and plant required therefrom. The defluorination, therefore, takes place in the fluidized reactor where the defluorinating reagent and rock are first caused to react.

It is important in carrying out the instant invention to add the defluorinating reagent into the fluidized bed. Addition of the reagent onto the surface of the bed is not satisfactory since the reagent becomes entrained in the exhaust gases and is carried out of the reactor before contacting the rock. In addition, such reagent causes a buildup of dust in the exhaust ducts necessitating shutdowns for cleanup.

The invention will be further described in connection with the following examples which are set forth for the purpose of illustration only and wherein proportions are in parts by weight unless specifically stated to the contrary.

EXAMPLE 1

Pebble phosphate rock was ground so that about 60 percent passed through +200 mesh. This rock was mixed with soda ash and then by means of air injected into a fluid bed reactor containing an established bed of previously defluorinated phosphate. Phosphoric acid containing 47 percent $P_2O_5$ was sprayed into the bed through a line independent of and slightly above the phosphate feed line. The feed composition (disregarding carbon dioxide in soda ash and water in the phosphoric acid) was as follows:

| | |
|---|---|
| Phosphate | 83 |
| Added $P_2O_5$ | 10 |
| Added $Na_2O$ | 7 |
| | 100 |

The feed rate was about 500 pounds per hour and the reactor bed temperature was maintained at about 2,370° F. The resultant product contained 18.4 percent phosphorous and 0.02 percent fluorine, and the $P_2O_5$ recovery was above 97 percent.

EXAMPLE 2

The procedure of example 1 was carried out except that an unground flotation concentrate (−14 to +150 mesh) was used in place of the ground phosphate and the defluorination was carried out at 2,440° F. The resulting product contained 18.4 percent phosphorous and 0.04 percent fluorine, and the $P_2O_5$ recovery was above 97 percent.

EXAMPLE 3

The following feed composition was used:

| | % Wt. |
|---|---|
| Phosphate (unground flotation concentrate) | 80.7 |
| Sand (to increase silica) | 0.7 |
| $P_2O_5$ (added as $H_3PO_4$) | 12.1 |
| $Na_2O$ (added as $Na_2CO_3$) | 6.5 |
| | 100.0 |

Phosphate, sand, and soda ash were metered into an MSA Bantam 400 Dust Blower. The combined ingredients were blown into the fluid-bed reactor below the bed surface. The phosphoric acid was sprayed into the bed at a point slightly above the dry material feed pipe. Dust collected from the cyclone was recycled to the bed.

The fluidizing air was preheated to 1,100° F. by means of an air to air heat exchanger and the temperature of the bed was 2,470° F.

The feed rate was 1,075 lbs./hr. (including $H_2O$ from phosphoric acid and $CO_2$ from soda ash) and the defluorinated product contained 18.13 percent phosphorous and 0.10 fluorine and the $P_2O_5$ recovery was above 97 percent.

EXAMPLE 4

The following feed compositions were used:

| | % Wt. | |
|---|---|---|
| | A | B |
| Phosphate (Unground flotation concentrate) | 80.4 | 80.9 |
| Sand | 0.8 | 0.6 |
| $Na_2O$ (as soda ash) | 6.6 | 6.4 |
| $P_2O_5$ (as phosphoric acid) | 12.2 | 12.1 |
| | 100.0 | 100.0 |

The phosphate concentrate, sand, and soda ash were metered into a MSA Bantam 400 Dust Blower. The combined ingredients were blown into the fluid-bed reactor well below the bed surface. In starting this test, acid was sprayed on top of bed. However, this was not satisfactory as acid became entrained and was carried into duct, cyclone, and scrubber. Acid in duct (between reactor and cyclone) caused a buildup to take place which proved troublesome throughout the remainder of the test. Duct had to be cleaned several times. Phosphoric acid (54 percent $P_2O_5$) was then sprayed into the bed at a point slightly above the dry material feed pipe. Dust collected from the cyclone was recycled to the bed.

The reactor bed temperature was maintained at 2,460°–2,475° F. and flow rates were 680 SCFM of air below the grid. Another 75 SCFM was used to inject the feed.

The resultant products had the following characteristics:

| | A | B |
|---|---|---|
| % Phosphorus | 18.11 | 18.19 |
| % Fluorine | 0.07 | 0.18 |

It will be understood that it is intended to cover all changes and modifications of the examples of the invention herein chosen for the purpose of illustration which do not constitute departures from the spirit and scope of the invention.

I claim:

1. Process for defluorinating fluorine-containing phosphate rock which comprises blowing such phosphate rock having a particle size of less than about 6 mesh (Tyler Standard) into a fluidized reactor bed below the upper surface thereof, separately but concurrently introducing phosphoric acid in the form of spray into the bed below the upper surface thereof, and maintaining the bed at a temperature between about 2,300° F. to about 2,600° F. sufficient to cause said phosphate rock and phosphoric acid to react and defluorinate the phosphate rock, said phosphate rock particles supplied to the bed contacting the spray in the fluidized bed, there being no reaction between said phosphate rock and phosphoric acid prior to the addition of said rock phosphate particles and phosphoric acid spray to said fluidized bed.

2. The process of claim 1 wherein the phosphate rock is a flotation concentrate.

3. The process of claim 2 wherein the phosphoric acid is added to the bed at a point just above the point of addition of the phosphate rock to the reactor.

4. The process of claim 1 wherein the phosphate rock has a particle size of −14+35 mesh (Tyler Standard) and the defluorination temperature is between about 2,520° to about 2,580° F.

5. The process of claim 1 wherein the phosphate rock has a particle size of substantially about −100 mesh (Tyler Standard) and the defluorination temperature is between about 2,350° to about 2,450° F.

* * * * *